(12) United States Patent
Swenson et al.

(10) Patent No.: US 7,719,968 B2
(45) Date of Patent: May 18, 2010

(54) MULTI-PRIORITY MULTI-COLOR MARKERS FOR TRAFFIC METERING

(75) Inventors: Erik Swenson, San Jose, CA (US); Stephen R. Haddock, LaHonda, CA (US); Thuan Nguyen, Thousand Oaks, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 848 days.

(21) Appl. No.: 11/323,212

(22) Filed: Dec. 30, 2005

(65) Prior Publication Data

US 2007/0153682 A1 Jul. 5, 2007

(51) Int. Cl.
*G01R 31/08* (2006.01)
(52) U.S. Cl. .................................. 370/229; 370/235.1
(58) Field of Classification Search ............... 370/235.1
See application file for complete search history.

(56) References Cited

U.S. PATENT DOCUMENTS

| 5,274,644 | A | 12/1993 | Berger |
| 5,596,576 | A | 1/1997 | Milito |
| 6,970,426 | B1 | 11/2005 | Haddock |
| 7,327,682 | B2 * | 2/2008 | Gandhi et al. ............ 370/235.1 |
| 2002/0087715 | A1 * | 7/2002 | De Cnodder et al. ........ 709/235 |
| 2004/0071081 | A1 * | 4/2004 | Rosenfled .................... 370/229 |

OTHER PUBLICATIONS

Int'l Search Report & Written Opinion dated Feb. 9, 2007 for Int'l Application No. PCT/US2006/042663.

European Patent Office, "Office Action—Communication pursuant to Article 94(3) EPC" for European Application No. 06827289.7, Mailed Dec. 23, 2008, 3 pages.

Patent Cooperation Treaty, International Preliminary Report on Patentability for Application No. PCT/US2006/042663, Mailed Jul. 10, 2008, 9 pages.

* cited by examiner

*Primary Examiner*—Kevin C Harper
*Assistant Examiner*—Sai-Ming Chan
(74) *Attorney, Agent, or Firm*—Blakely, Sokoloff, Taylor & Zafman LLP

(57) ABSTRACT

A metering device has a first token bucket with a profile, a rate, and a maximum number of tokens. The device has another token bucket with its own profile, two associated rates, and a maximum number of tokens. In operation, the device adds tokens in the first token bucket at its rate if the bucket has less than the maximum number of tokens for that bucket, and adds a number of tokens in the other token bucket at the same rate if the first token bucket is full and the other token bucket is not. Additionally, the device adds tokens in the second token bucket according to the second rate associated with the token bucket if it is not full. When receiving a packet, if the packet has a first marking, and the first token bucket has a sufficient number of tokens, the packet's marking is maintained and the number of tokens in the first bucket is decremented, else, if the packet has one of two markings, and the second token bucket has a sufficient number of tokens, the packet's second marking is selected and the second token bucket is decremented, else, if the packet has a marking other than one of the two markings, the packet's marking is maintained as other than one of the two markings.

49 Claims, 6 Drawing Sheets ns in the received traffic stream are already colored ("pre-colored"), for example, one of colors green, yellow, and red. The details of the pre-coloring process and how the meter detects or determines the color of a packet is implementation specific and outside the scope of the RFCs as well as this invention.
MULTI-PRIORITY MULTI-COLOR MARKERS FOR TRAFFIC METERING

TECHNICAL FIELD

The present invention generally relates to the field of data communications. In particular, the present invention relates to a device metering a received data stream and marking packets in the data stream differently, for example, based on one factor, or a combination of one or more factors, such as packet rate, packet length, time of arrival of a packet in the data stream, etc. A packet may be marked, and remarked, for example, to indicate a level of assurance as to whether the packet is forwarded or discarded.

BACKGROUND

A rate color marker can meter packets in a traffic stream and mark the packets based on traffic parameters. Such metering and marking can be used to enable services such as quality of service or congestion control in communication networks. Two similar color rate markers are documented in Internet Engineering Task Force (IETF) Informational Request For Comments (RFC) 2697 and 2698. See Heinanen, J. and R. Guerin, "A Single Rate Three Color Marker", RFC 2697, September, 1999, and Heinanen, J. and R. Guerin, "A Two Rate Three Color Marker", RFC 2698, September, 1999.

The referenced RFCs describe color rate marker algorithms in the context of an Internet Protocol (IP)-based packet switched internetwork. However, such algorithms can be implemented in cell-switched networks as well. Each color marker meters a traffic stream, for example, an IP packet stream, and marks its packets one of green, yellow or red.

The Single Rate Three Color Marker (srTCM) described in RFC2697 marks packets in an IP stream based on a traffic rate, Committed Information Rate (CIR), and two different burst sizes, Committed Burst Size (CBS), and Excess Burst Size (EBS). In short, a packet is marked green if it does not exceed CBS, yellow if it does exceed CBS but does not exceed EBS, and red if it exceeds both CBS and EBS. srTCM is limited in that it uses the length, but not peak rate, of a burst of traffic to determine the color associated with the traffic. A service, or a level of service, is then provided to the traffic based on its color.

The Two Rate Three Color Marker (trTCM) described in RFC 2698 marks packets in an IP stream based on two different traffic rates, Peak Information Rate (PIR), and Committed Information Rate (CIR), and corresponding burst sizes Committed Burst Size (CBS) and Peak Information Burst (PBS). According to trTCM, a packet is marked red if it exceeds PIR, and if the packet does not exceed PIR, it is marked yellow or green depending on whether it exceeds CIR or does not exceed CIR. By making use of two rates, a peak traffic rate (or simply, peak rate), and a committed rate, trTCM is able to monitor peak rate traffic separate from committed rate traffic.

Both srTCM and trTCM contemplate a metering device that meters each packet in a traffic stream and forwards, or passes, the packet to a marker that colors the packet. Both algorithms operate in one of two modes, color-blind mode, in which the meter receives the traffic stream as if it is uncolored, and color-aware mode, in which packets in the received traffic stream are already colored ("pre-colored"), for example, one of colors green, yellow, and red. The details of the pre-coloring process and how the meter detects or determines the color of a packet is implementation specific and outside the scope of the RFCs as well as this invention.

The RFCs disclose the marker recoloring a packet based on the results of the meter, and provide, as an example, coding the color as a codepoint in the Diffserv (DS) field of the packet in a per-hop behavior (PHB) specific manner, and refers one to IETF RFC2474 for further information. See Nichols, K., Blake, S., Baker, F. and D. Black, "Definition of the Differentiated Services Field (DS Field) in the IPv4 and IPv6 Headers", RFC 2474, December, 1998. The color can be coded as a drop precedence of the packet, according to RFC2597. See Blake, S., Black, D., Carlson, M., Davies, E., Wang, Z. and W. Weiss, "An Architecture for Differentiated Services", RFC 2475, December 1998.

Both color markers can mark packets in a traffic stream, for example, such that different levels of assurance are provided to packets based on whether the packets are green, yellow or red. Decreasing levels of service may be provided to green, then yellow, then red, packets. For example, green packets may be guaranteed delivery, or at least forwarded with a low probability of being discarded or dropped, while yellow packets may be forwarded on a best effort basis, and red packets dropped.

The RFCs describe Three Color Markers as a way of controlling the admission rate, burst size, and drop precedence of a single stream of packetized data. They do not address how to control these characteristics when the data is divided into multiple streams of different priorities.

Prior approaches to using these markers for data streams with multiple priority levels include:
  a. Divide the data into separate streams for each priority using a single marker per priority, or
  b. Treat all data of all different priorities as a single data stream using a single marker, or
  c. Combine the above two approaches in an hierarchical fashion by first dividing the streams and using a marker per priority, then combining the streams again and meter them with a single, second-level marker.

The advantages and disadvantages of each approach depend on whether the objective is to control the aggregate rate of the combined stream, or the individual rates of each priority stream. In either case, it is desirable to give preferential treatment to the higher priority traffic. For example, as long as the incoming rate and burst characteristics of the highest priority data stream is within the committed rate and committed burst size of the marker used for that data stream, all of the highest priority data packets should be marked green regardless of how much lower priority data is present. In some cases it is acceptable to control the rate and the burst of each priority stream independently, in which case the first approach above meets the requirements. The disadvantage of this approach is that in the absence of higher priority traffic, the lower priority traffic cannot use the bandwidth reserved for the higher priority traffic. This results in lost bandwidth and inefficient network utilization.

The second approach controls the aggregate rate of all priorities by effectively ignoring the priority. This allows lower priority traffic to consume the full rate in the absence of higher priority traffic, but it cannot provide preferential treatment to higher priority traffic when packets of multiple priorities are intermixed.

The hierarchical structure in the third approach can be configured to partially meet both objectives of giving preferential treatment to higher priority traffic while allowing lower priority traffic to consume full bandwidth in the absence of higher priority traffic. If the sum of the rate and burst sizes of the committed rate buckets for all priorities in the first level is equal to the rate and burst size of the committed rate bucket in the second level, then preferential treatment for higher priority traffic can be guaranteed (within the committed rate and burst size specifications). The sum of the rate and burst sizes of the excess rate buckets for all priorities in the first level can then be configured to exceed the rate and burst size of the excess rate bucket in the second level. This allows any priority traffic to consume the excess bandwidth. The combined effect is that preferential treatment of higher priority traffic is guaranteed within the committed rate and burst size for that priority, but any bandwidth unused by higher priority traffic can only be consumed by lower priority traffic if the lower priority traffic is marked as excess. Significantly, this approach cannot meet both objectives when configured as a single rate two color marker.

SUMMARY

A rate color marker algorithm for multiple priorities that assures preferential treatment for higher priority traffic while allowing low priority traffic to utilize any bandwidth not consumed by higher priority traffic is disclosed. The algorithm provides that lower priority traffic need not always be marked as excess traffic. An embodiment of the invention is a dual rate three color marker that can be configured to operate as a single rate three color marker (by setting the excess information rate source to zero) or a single rate two color marker (by setting the excess bucket size for all priorities to zero). However, the invention generally encompasses a marker for multiple rates and multiple colors.

BRIEF DESCRIPTION OF THE DRAWINGS

The present invention is illustrated by way of example, and not by way of limitation, in the figures of the accompanying drawings in which.

DETAILED DESCRIPTION

The invention is a multiple rate multiple color marker for multiple priorities, or simply, a rate color marker. A two-rate three color marker for multiple priorities can be characterized as an array of token buckets with a committed bucket for each priority and an excess bucket for each priority. A committed rate source deposits tokens in the committed bucket for the highest priority. If that bucket is full, the tokens are deposited in the committed bucket for the next lowest priority, and so forth. When the committed bucket for the lowest priority is full, the tokens may be discarded ("decoupled" mode), or may be deposited in the excess bucket for the highest priority ("coupled" mode). An excess rate source also deposits tokens in the excess bucket for the highest priority. If that bucket is full, any tokens that would have been deposited there are deposited in the excess bucket for the next lower priority, and so forth. When the excess bucket for the lowest priority is full, any tokens that could have been deposited there are discarded. The initial state of the buckets may be empty or full, though traditionally the initial state is full in order to accommodate the possibility that a burst of packets arrives right when the system is turned on. The term "full" as used herein does not necessarily suggest that a "full" bucket is absolutely full. In addition to being absolutely full, a "full" bucket can be one that is mostly full or nearly full. In other words, it is not a requirement that a bucket has exactly the maximum number of tokens to be considered "full."

The rate at which tokens are deposited in a bucket can be achieved in several ways. In one embodiment, a bucket receives tokens one at a time in continuous fashion to achieve a "rate." In another embodiment, a bucket receives multiple tokens at the same time at a fixed periodic interval to achieve a "rate." In yet another embodiment, a bucket receives a number of tokens based on packet arrival such that a "rate" is achieved over a period of time.

The prior art (RFC 2697 and MEF10) describes an algorithm for metering and marking packets as they arrive by comparing the packet length to the number of tokens in the committed and/or excess buckets, marking the packet accordingly, and consuming tokens from the appropriate bucket based on the marking decision. The algorithm includes both color blind and color aware modes of operation. This invention modifies the algorithm so that each packet has a designated priority, and the number of tokens in the committed and/or excess buckets for the corresponding priority are compared to a threshold.

Figure 1:
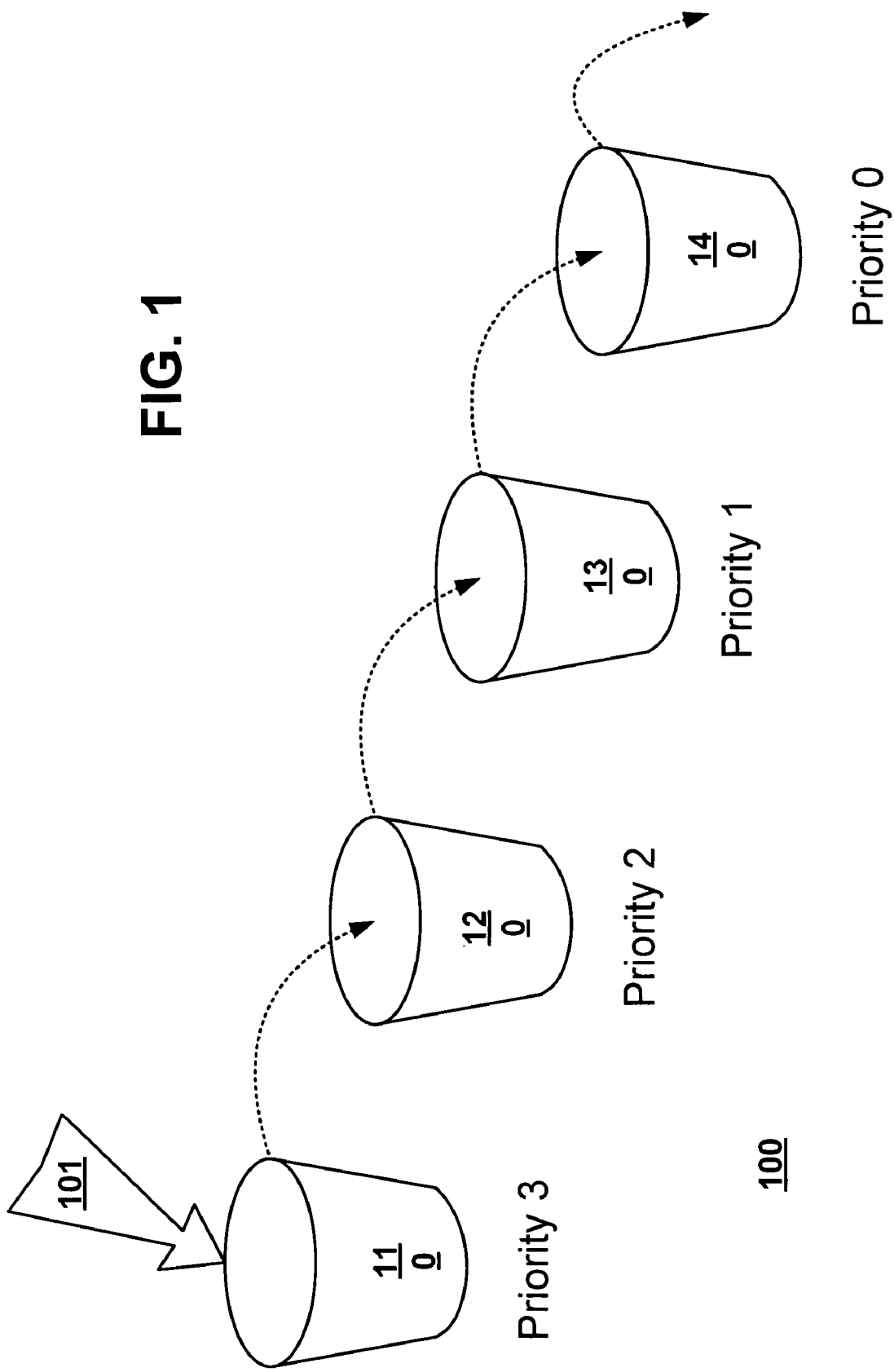
FIG. 1 provides a flow diagram of an embodiment of the invention.

With reference to FIG. 1, an embodiment of the invention 100 will now be described. Embodiment 100 is a single rate two-color marker. In this embodiment, the excess information rate is set to zero and the excess bucket size for all priorities is set to zero. Thus, there is a single row of buckets 110, 120, 130, and 140, each bucket having a different priority. While the illustrated embodiment has four priorities, it is understood that an embodiment may have two or more priorities. Bucket 110 has the highest priority (priority 3) while bucket 140 has the lowest priority (priority 0). Also, for purposes of this discussion, each bucket in the row is designated as a green bucket.

A single committed rate source 101 controls the maximum aggregate rate for packets of all priorities. All arriving packets of the highest priority (priority 3) up to the committed rate will be marked green. Any arriving packets of priority 3 exceeding the committed rate will deplete the tokens stored in the priority 3 green bucket 110 and subsequent packets will be marked red. As long as priority 3 packets are arriving at a rate greater than or equal to the aggregate committed rate 101, any lower priority packets arriving will deplete the tokens in the bucket corresponding to the packet's priority and subsequent packets will be marked red. For example, if priority 3 packets are arriving at a rate greater than or equal to 101, then arriving priority 2 packets will deplete the tokens in bucket 120 (priority 2) and subsequent priority 2 packets will be marked red. It follows that arriving priority 1 and priority 0 packets will deplete the tokens in each of buckets 130 and 140, respectively.

If priority 3 packets are arriving at a rate less than the aggregate committed rate 101, bucket 110 will fill and subsequent tokens will flow into bucket 120. This allows arriving packets of priority 2 to be marked green up to the committed aggregate rate 101 minus the actual rate of the priority 3 traffic. If priority 2 packets are arriving at a rate less than the aggregate committed rate 101 minus the rate of the priority 3 traffic, bucket 120 will also fill and subsequent tokens will flow into bucket 130. If and when bucket 130 fill with tokens, then subsequent tokens will flow into bucket 140. Once bucket 140 is filled with tokens, subsequent tokens are discarded.

In another embodiment, bucket 110 stores tokens for all priorities (i.e. priorities 0-3) of packets. (It should be noted that classifications other than priority might be used to distinguish packets, including class of traffic, source address, destination address, source/destination address combinations, virtual local area network (VLAN) identification (ID), protocol, application type, etc.) A threshold number (of tokens) is designated for each priority and bucket 110 continues to receive tokens at the committed rate 101. But in this embodiment, tokens are discarded once bucket 110 fills with tokens. As packets arrive, the number of tokens in bucket 100 is compared against the threshold number of tokens for the priority of the packet. If the threshold is satisfied for a particular packet, the packet is marked green and tokens are depleted from bucket 110. Otherwise, the packet is marked red. In other embodiments, three or more colors may be used in marking packets. In one embodiment, the threshold number is higher for low priority packets and lower for high priority packets. In other words, the bucket must have a high number of tokens for a low priority packet to satisfy the threshold while the bucket needs a relatively low number of tokens to satisfy the threshold for a high priority packet. However, one skilled in the art will appreciate that any threshold can be used for any priority or class of packet.

Figure 2:
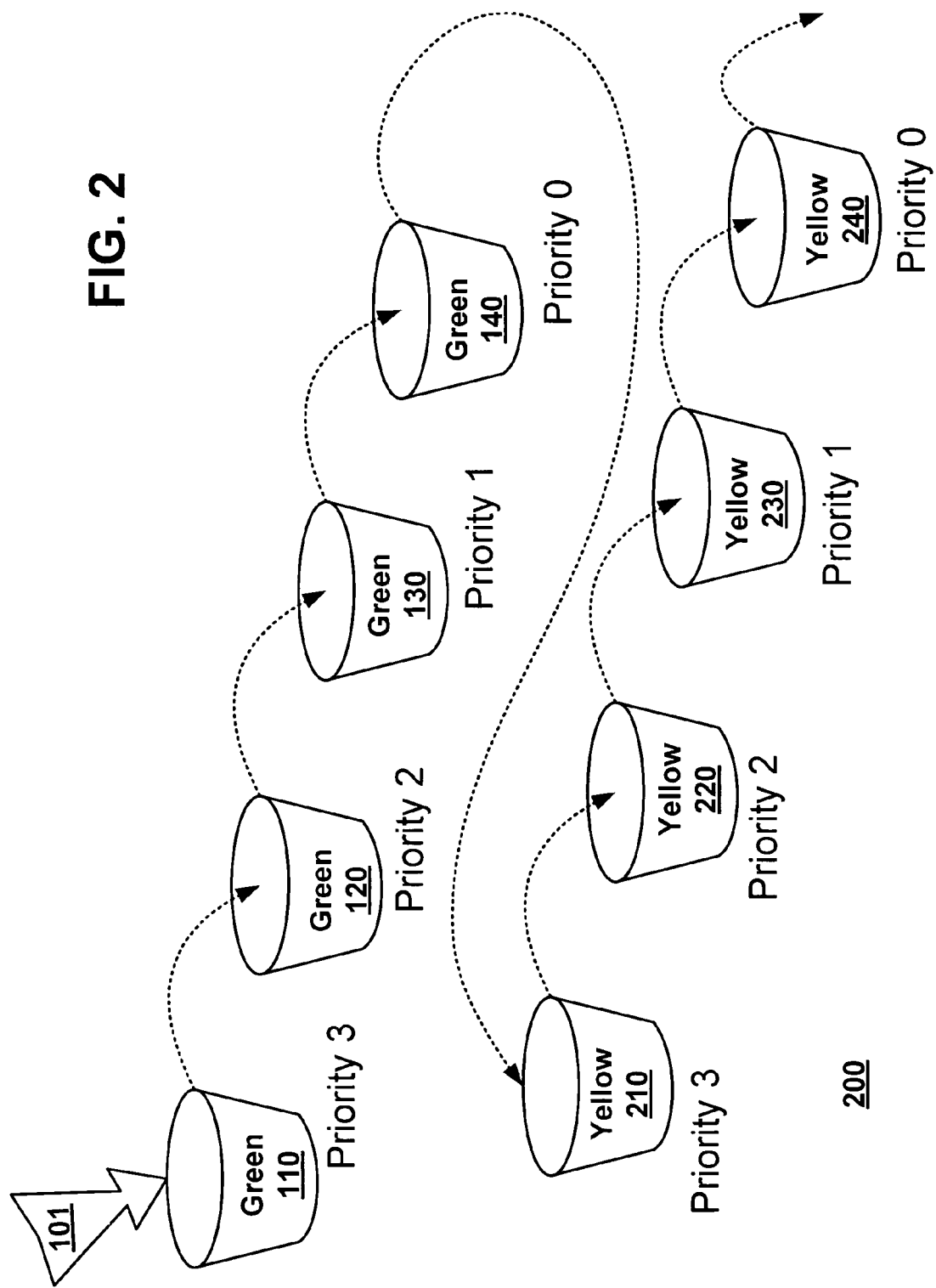
FIG. 2 provides a flow diagram of an embodiment of the invention.

An embodiment of the invention, with reference to FIG. 2 will now be described. This embodiment for a single rate three-color marker is similar to that of FIG. 1, the difference being the addition of a second row of buckets 210, 220, 230, and 240, respectively. The second row of buckets is "coupled" to the first row, making this a coupled single rate three-color marker. Coupling the rows of buckets will be described in further detail below. For purposes of this discussion, each bucket in this second row is a yellow bucket. Just as the green row of buckets is prioritized, so is the yellow row of buckets prioritized. Bucket 210 is the highest priority (priority 3) yellow bucket while bucket 240 is the lowest priority (priority 0) yellow bucket.

Embodiment 200 comprises the same single committed rate source as in the previous embodiment. Note that tokens never flow into the yellow buckets unless the green buckets for all priorities are full. For example, when bucket 110 fills with tokens, subsequent tokens flow into bucket 120, and then to buckets 130 and 140, respectively. However, when bucket 140 fills with tokens, subsequent tokens are not discarded but rather they flow into the priority 3 yellow bucket 210. The overflow of tokens from the lowest priority green bucket 140 to the highest priority yellow bucket 210 represents the coupling mentioned above. When bucket 210 fills with tokens, subsequent tokens flow into bucket 220, etc. Finally, when all other buckets are filled with tokens, subsequent tokens flow into bucket 240. Once bucket 240 is full of tokens, subsequent tokens are discarded.

Given that tokens never flow into the yellow buckets unless the green buckets for all priorities are full, no excess traffic will be permitted unless the aggregate packet arrival rate across all priorities has been below the committed rate for some period of time. When this situation does occur, the tokens in the yellow buckets allow for a larger burst when the packet arrival rate picks up (i.e. the yellow buckets provide excess burst capacity).

Figure 3:
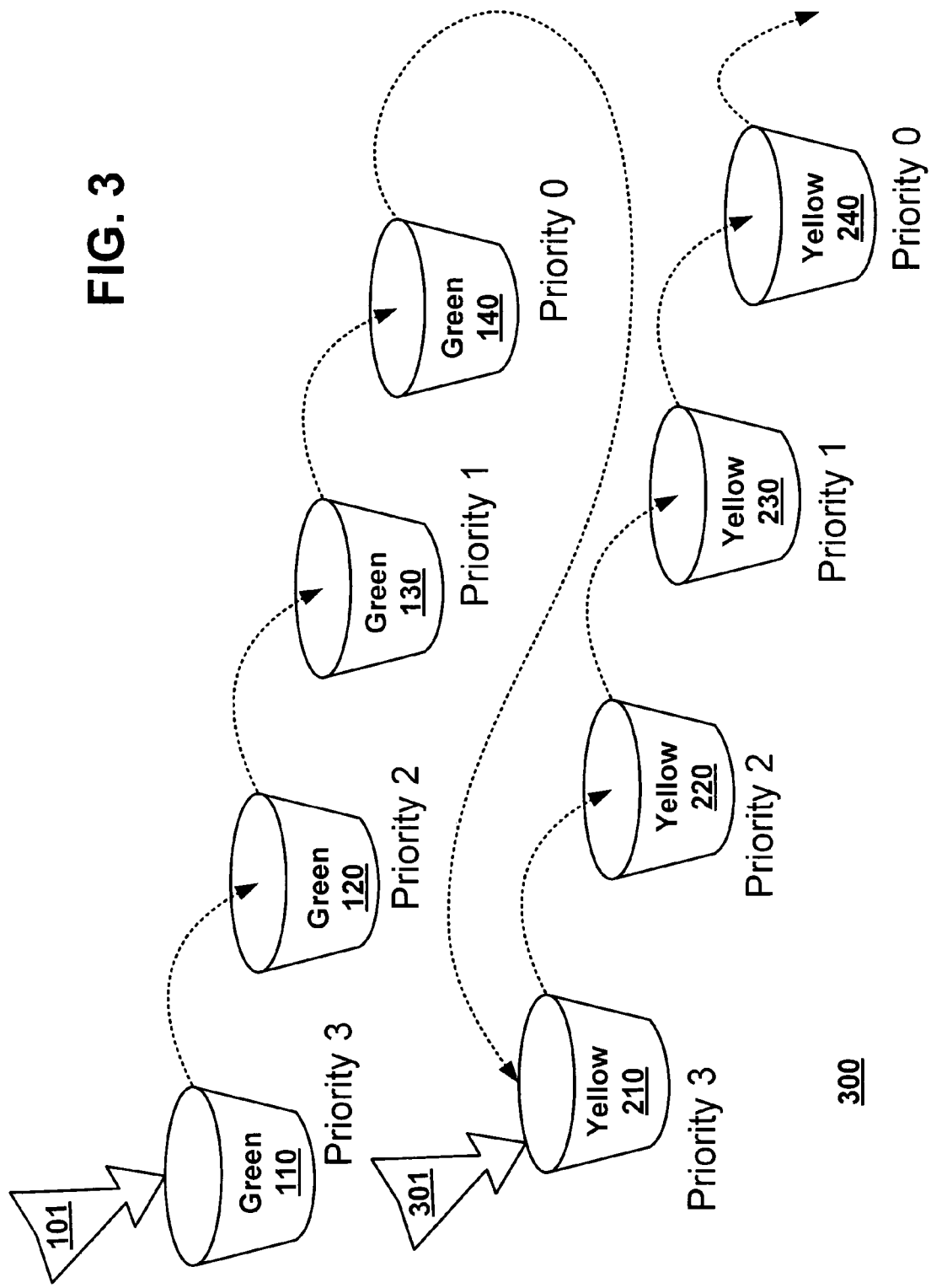
FIG. 3 provides a flow diagram of an embodiment of the invention.

FIG. 3 illustrates an embodiment of the invention that includes an excess rate source 301 for the highest priority yellow bucket 210. This embodiment is a coupled dual rate three-color marker analogous to that described in MEF10, but with the capability of providing preferential treatment to higher priority traffic. Note that even for the excess traffic, the sequence in which the yellow buckets fill with tokens assures that higher priority packets will be given preference (i.e. less likely to be marked red) over lower priority traffic.

Figure 4:
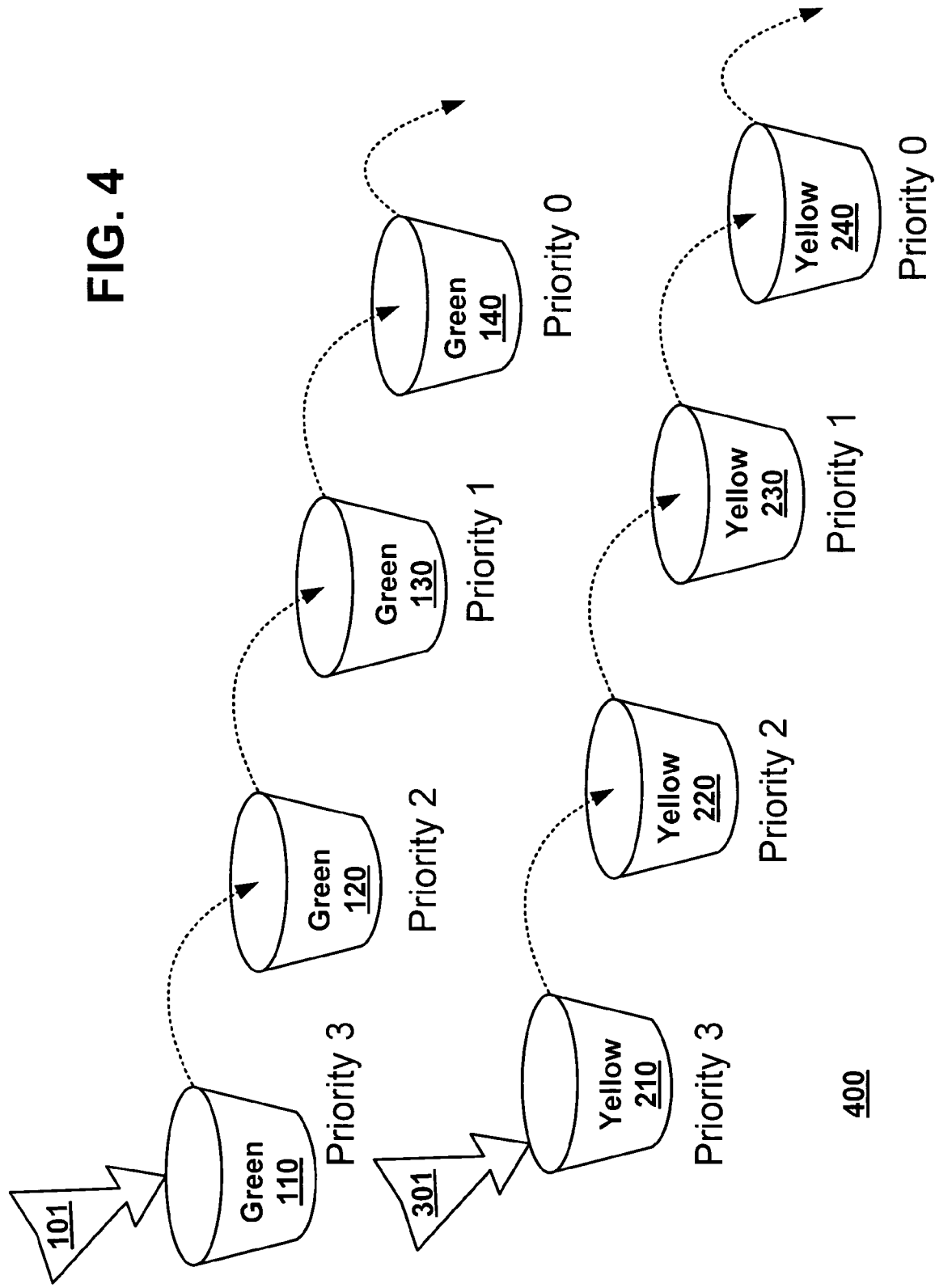
FIG. 4 provides a flow diagram of an embodiment of the invention.

FIG. 4 illustrates an embodiment of the invention that provides for a decoupled dual rate three-color marker (drTCM). Unlike the coupled drTCM, described above with respect to FIG. 3, the decoupled drTCM does not send overflow tokens from the lowest priority green bucket 140 to the highest priority yellow bucket 210. Rather, when bucket 140 fills with tokens, subsequent tokens are discarded. Similarly, when bucket 240 fills with tokens, subsequent tokens are discarded. By decoupling the green row of buckets from the yellow row of buckets, incoming yellow traffic cannot utilize any unused green traffic bandwidth.

Figure 5:
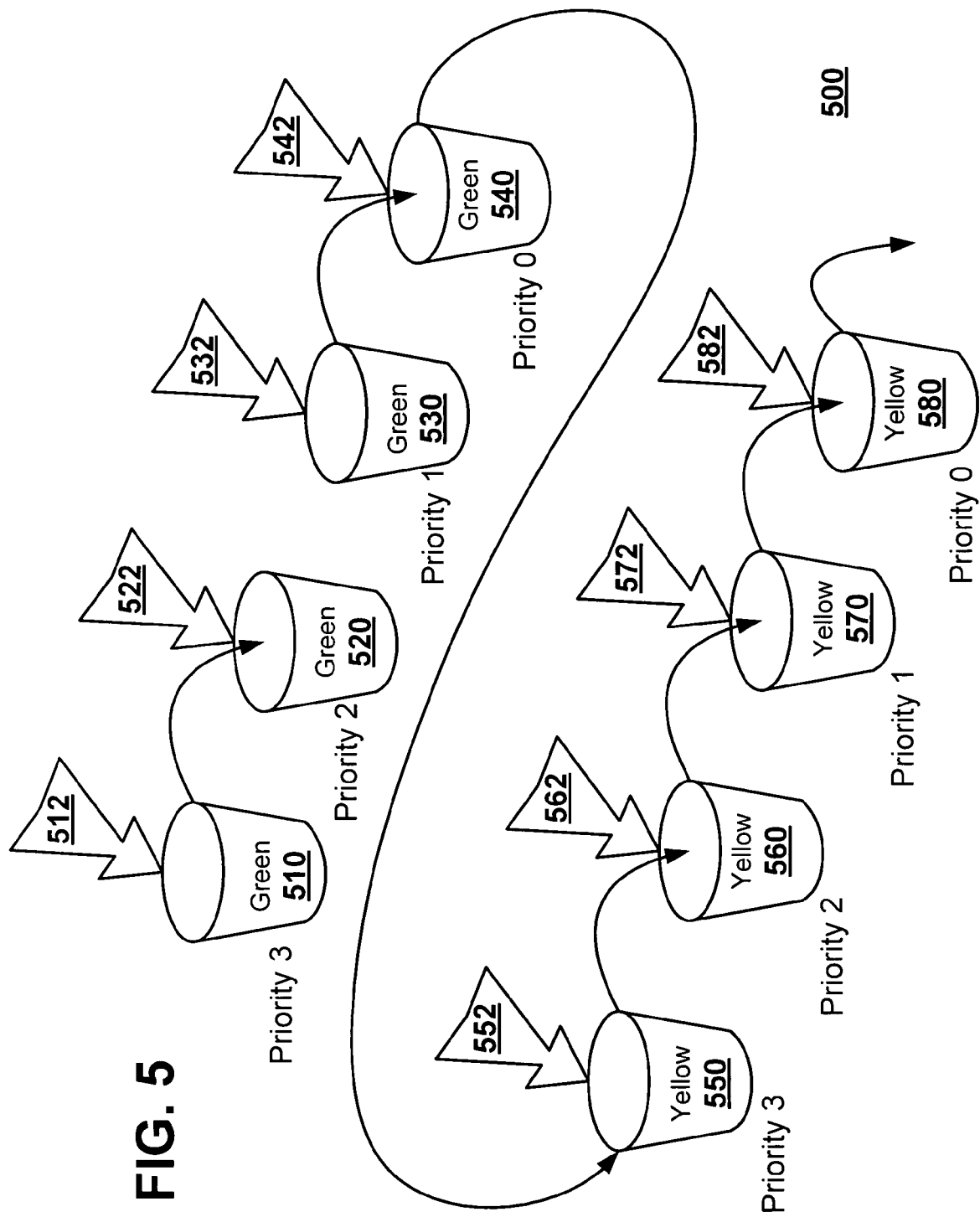
FIG. 5 provides a flow diagram of an embodiment of the invention.

The invention can be generalized by adding rate sources to any or all of the buckets. FIG. 5 illustrates an embodiment where all buckets have a separate rate source. Buckets 510, 520, 530, and 540 are green buckets having committed burst sizes and committed rate sources 512, 522, 532, and 542, respectively. Buckets 550, 560, 570, and 580 are yellow buckets having excess burst sizes and excess rate sources 552, 562, 572, and 582, respectively. The sum of the committed rate sources equals the overall committed rate. Similarly, the sum of the excess rate sources equals the overall excess rate. The effect of having separate rate sources for each bucket is to guarantee some bandwidth, up to the rate of each bucket, is always available at each level of priority regardless of the rate of higher priority traffic.

For example, bucket 510 fills with tokens at a rate 512. When bucket 510 fills with tokens, subsequent tokens flow into bucket 520 at rate 512. Additionally, tokens flow into bucket 520 at a rate 522. Thus, if bucket 510 is full of tokens, bucket 520 fills with tokens at a rate equal to the sum of its own rate 522 plus rate 512 of bucket 510. This creates a cascade of rate aggregation that may continue to the lowest priority green bucket 540. Thus, during a period of time when no higher priority packets are being received (and corresponding higher priority bandwidth is not being used), packets of priority 0 may be processed at the overall committed rate. In other words, when buckets 510, 520, and 530 are not consuming tokens to process packets, tokens will flow into bucket 540 at a total rate equal to committed rate 542 plus the sum of rates 512, 522, and 532. Similarly, packets of priority 1 may be processed at a total rate equal to the committed rate 532 plus the sum of rates 512 and 522.

As shown in FIG. 5, when green bucket 540 fills with tokens, subsequent tokens flow into yellow bucket 550. This scenario is significant when the system is operating in a color-aware mode because it allows pre-colored yellow traffic to use the additional bandwidth provided by the token overflow from bucket 540 to bucket 550. In color-aware mode, packets arrive pre-colored as one of green, yellow, or red. Thus, if a green packet of priority m arrives, then green tokens of priority m will be consumed and the priority m green packet will be processed if there are a sufficient number of tokens in the corresponding priority m green bucket. If there are not sufficient tokens in the priority m green bucket, then the priority m green packet is marked yellow and the priority m green tokens will not be consumed. If there are a sufficient number of tokens in the yellow bucket of priority m, priority m yellow tokens will be consumed and the priority m yellow packet will be processed. If there are insufficient tokens in the priority m yellow bucket, the priority m yellow packet will be marked red and the priority m yellow tokens will not be consumed.

The flow of tokens from green bucket 540 into yellow bucket 550 signifies a period of 15 time when green packets have been arriving at a rate less than the overall committed rate. Thus, the bandwidth corresponding to the overall committed rate is not being fully consumed by incoming green traffic. Sending overflow tokens from green bucket 540 to yellow bucket 550 allows yellow traffic to utilize the unused green traffic bandwidth.

Additionally, yellow buckets 550, 560, 570, and 580 may fill with tokens at excess rates 552, 562, 572, and 582, respectively. The effect of the separate excess rate sources is to guarantee some excess bandwidth is always available at each level of priority. The sum of each of the excess rates equals the overall excess rate.

Considering that when green bucket 540 is full and that overflow tokens are then sent from bucket 540 to yellow bucket 550, it is possible for bucket 580 to use the entire bandwidth corresponding to the overall committed rate and the overall excess rate if the level of green traffic and higher priority yellow traffic is sufficiently low. If the green traffic bandwidth and higher priority yellow traffic bandwidth is not fully consumed for a sustained period of time, all green and yellow buckets of all priorities will eventually fill with tokens.

An embodiment according to FIG. 6 will now be described. Embodiment 600 is illustrated as having a 2-by-n array of buckets. One of skill in the art will appreciate that any two-dimensional array of size x-by-n can be implemented in accordance with the invention. Thus, embodiment 600 shows 2 rows and n+1 columns of buckets. Each of the rows is labeled with a color. In this case, each row is labeled one of green or yellow. Each of the columns has a priority from zero to n, where n is the highest priority and zero is the lowest priority.

Other combinations of colors, ordering, or other labels can be used to distinguish and/or prioritize the rows of buckets. Likewise, other combinations, ordering, classifications, or other labels can be used to distinguish and/or prioritize the columns of buckets. The organization of rows and columns may be based on levels of priority. However, it is not necessary for the rows and columns to be organized based on levels of priority. For example, the rows and columns can be organized based on packet size, packet destination, or other packet characteristics known in the art. In one embodiment, the columns are classified based on a class of traffic. In other embodiments, the columns are classified based on source address, destination address, source/destination address combinations, virtual local area network (VLAN) identification (ID), protocol, application type, etc.

Each bucket in embodiment 600 has an independent rate source. The independent rate sources may also operate as an aggregated whole. For example, rate sources 612, 622, and 632 may operate in combination to form an overall committed rate. Thus, if rate source 622 has its rate lowered by an amount, then rate source 632 may have its rate raised by the same amount such that the overall committed rate remains unchanged. Likewise, rate sources 642, 652, and 662 may operate in combination to form an overall excess rate. Additionally, all buckets in embodiment 600 may operate in combination to form an overall total rate.

The operation of embodiment 600 is similar for each bucket. Each bucket receives tokens at a rate, which may differ. Each bucket is capable of having a respective maximum number of tokens, which also may differ. Each bucket receives tokens at its respective rate until it has reached its respective maximum number of tokens. Once the bucket is full of tokens, subsequent tokens (or overflow tokens) must be distributed elsewhere. The system selects an option for distributing overflow tokens. Options can be pre-selected, or when overflow occurs, for each bucket. The criteria and/or process for selecting options for distributing overflow tokens is not discussed herein and is beyond the scope of the present invention.

A first option for distributing overflow tokens is to send them to the next lowest priority bucket in the same row or to the next lowest priority bucket in the row that is not full of tokens if the overflow tokens are not from the lowest priority bucket in the row. For example, when green bucket 610 (priority n) fills with tokens from rate source 612, the system may send overflow tokens to the next lowest priority bucket in the row, i.e. green bucket 620 (priority n−1), at rate 612. If bucket 620 is also full of tokens, the system may send the overflow tokens of bucket 610 to bucket 630 at rate 612.

A second option for distributing overflow tokens is to send overflow tokens to a bucket in the next lower row. In one example, when green bucket 610 fills with tokens from rate source 612, the system may send overflow tokens to yellow bucket 640. Buckets 610 and 640 are both priority n buckets. If yellow bucket 640 is full of tokens, bucket 610 or bucket 640 may send the overflow tokens to yellow bucket 670, which is also a priority n bucket. In another example, when green bucket 630 fills with tokens, the system may send overflow tokens to yellow bucket 660 as the next lower priority 0 bucket in the column. However, given that green bucket 630 is the lowest priority green bucket, the system may rather or also send overflow tokens to the highest priority yellow bucket 640. In this way, a prioritized cascading effect can be achieved.

Figure 6:
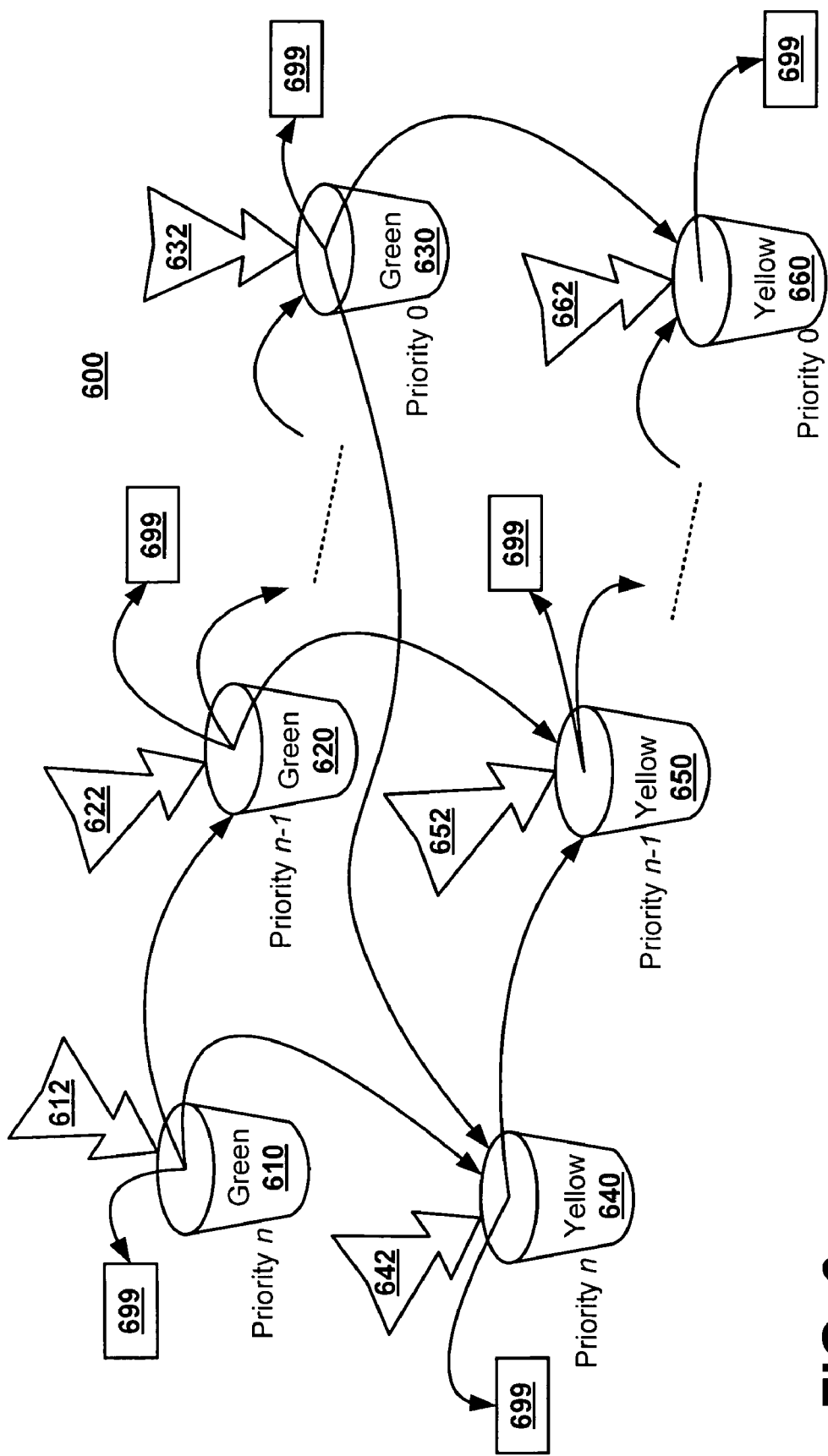
FIG. 6 provides a flow diagram of an embodiment of the invention.

A third option for distributing overflow tokens is to discard overflow tokens as depicted at 699 in FIG. 6. As tokens are discarded, corresponding bandwidth goes unused and is effectively lost during the period of discarding tokens.

In one embodiment, the system receives a packet, for example, of priority n−1. Thus, the system first checks if the corresponding green bucket 620 has a sufficient number of tokens to process the packet. In one embodiment, the sufficiency of tokens is determined by comparing the number of tokens in the bucket to a threshold value. In another embodiment, the sufficiency of tokens is determined by comparing the size of the received packet to the number of tokens in the bucket. If the size (for example, in bytes) of the packet is less than or equal to the number of tokens in the bucket, then there is a sufficient number of tokens to process the packet. If there are a sufficient number of tokens in bucket 620, the packet is marked green and the number of tokens in bucket 620 is decremented by the number of bytes in the packet.

If the size of the packet is greater than the number of tokens in bucket 620, then bucket 620 is not decremented and the system then checks if there is a sufficient number of tokens in the yellow priority n−1 bucket 650. If the size of the packet is less than or equal to the number of tokens in bucket 650, then the packet is marked yellow and the number of tokens in bucket 650 is decremented accordingly. If the size of the packet is greater than the number of tokens in bucket 650, then bucket 650 is not decremented and the packet is marked red.

In the system described herein, the size of received packets may only be compared against the number of tokens in buckets of corresponding priority. In other words, an incoming priority n packet may only be processed based on a comparison of the packet's size to the number of tokens in a priority n bucket. The size of a priority n packet may not be compared to the number of tokens in a priority n−1 bucket for processing purposes.

In an embodiment of the invention in which a device is operating in color-blind mode, the size of an incoming priority n packet may be first compared against the number of tokens in the corresponding priority n green bucket 610 for processing purposes. However, if operating in color-aware mode, received packets are pre-colored when they arrive. In color-aware mode, the size of an incoming priority n green packet may also be compared to the number of tokens in the priority n green bucket 610. But if the incoming packet is a priority n yellow packet, the size of the packet must be compared to the number of tokens in the corresponding priority n yellow bucket 640. If yellow bucket 640 is full of tokens, then bucket 640 is not decremented and the packet is marked red.

It should be noted that reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented, for example, in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as binary digits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general-purpose computer selectively activated or reconfigured by a computer program stored in the computer. Such a computer program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices; electrical, optical, acoustical or other form of propagated signals (e.g., carrier waves, infrared signals, digital signals, etc.), or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. In addition, the present invention is not described with reference to any particular programming language. It will be appreciated that a variety of programming languages may be used to implement the teachings of the invention as described herein.

What is claimed is:

1. In a metering device having colored rows and classified columns of token buckets, a method to give preferential treatment to higher priority traffic and allow lower priority traffic to consume up to all available bandwidth based on an absence of the higher priority traffic or a bandwidth consumption rate of the higher priority traffic which is less than a sum of a committed information rate and a peak information rate associated with the higher priority traffic, wherein the method comprises:

adding tokens to a first token bucket in a first colored row having a high priority, wherein the tokens are added at a committed information rate up to a maximum number of tokens allowed in the first token bucket, wherein tokens in the first token bucket in excess of the committed information rate and up to the maximum number of tokens allowed in the first token bucket correspond to the peak information rate for the first token bucket, and wherein the higher priority traffic consumes tokens from the first token bucket based on the bandwidth consumption rate of the higher priority traffic;

adding tokens in excess of the maximum number of tokens allowed in the first token bucket to one or more other token buckets in the same first colored row having the same high priority and a different classified column, wherein the tokens are added to the one or more other token buckets at the committed information rate, and wherein the higher priority traffic consumes tokens from the one or more other token buckets based on the bandwidth consumption rate being in excess of the committed information rate and the peak information rate recjuiring more tokens than are available in the first token bucket;

adding tokens in excess of a maximum number of tokens allowed in the one or more other token buckets to a lower priority token bucket belonging to a different colored row having a lower priority than the first token bucket in the first colored row and belonging to the same classified column as the first token bucket, wherein the tokens are added to the lower priority token bucket at the commilled information rate up to a maximum number of tokens allowed in the lower priority token bucket; and discarding tokens at the committed information rate when all token buckets in all colored rows possess a maximum number of tokens allowed within each of the respective token buckets.

2. The method of claim 1 further comprising:

when receiving a data packet having a classification that corresponds to a column, reducing the number of tokens in a bucket belonging to the colunm and associating a first color with the packet if there is a sufficient number of tokens in the bucket, else reducing the number of tokens in a different bucket belonging to the column and associating a second color with the packet.

3. The method of claim 2 wherein the number of tokens in the different bucket are reduced and the second color is associated with the packet if there is a sufficient number of tokens in the different bucket, else
associating a third color with the packet.

4. The method of claim 2, wherein:
associating the first color with the packet comprises associating the color green with the packet;
associating the second color with the packet comprises associating the color yellow with the packet; and
associating the third color with the packet comprises associating the color red with the packet.

5. The method of claim 1, further comprising:
adding tokens in excess of the maximum number of tokens allowed in the lower priority token bucket to one or more other lower priority token buckets in the different colored row having the lower priority than the first token bucket in the first colored row, wherein the one or more other lower priority token buckets each belong to a different classified colunm than the first lower priority token bucket, and wherein the tokens are added to the one or more other lower priority token buckets at the committed information rate up to a maximum number of tokens allowed for each of the one or more other lower priority token buckets, and further wherein a lower priority traffic consumes tokens from the one or more lower priority token buckets based on a lower priority assigned to the lower priority traffic and based further on a bandwidth consumption rate of the lower priority traffic being in excess of the committed information rate for the lower priority traffic and the peak information rate for the lower priority traffic requiring more tokens than are available in the first lower priority token bucket.

6. The method of claim 1, wherein tokens are added to other buckets each bucket at one or more different rates, distinct from the committed information rate at which tokens are initially added to the first token bucket.

7. The method of claim 2, wherein the sufficient number of tokens is determined by comparing a size of the data packet to the number of tokens in the bucket, and wherein there is a sufficient number of tokens when the number of tokens in a bucket is greater than or equal to the size of the packet measured in bytes.

8. The method of claim 1, wherein a bucket is full of tokens if the bucket has the maximum number of tokens.

9. The method of claim 2, wherein there is a sufficient number of tokens if the number of tokens in a bucket is greater than or equal to a threshold value.

10. The method of claim 1 wherein the columns are classified based at least in part on an application type associated with traffic received.

11. In a metering device having colored rows and classified columns of token buckets and wherein each token bucket is capable of having a maximum number of tokens, a method to give preferential treatment to higher priority traffic and allow lower priority traffic to consume up to all available bandwidth based on an absence of the higher priority traffic or a bandwidth consumption rate of the higher priority traffic which is less than a sum of a committed information rate and a peak information rate associated with the higher priority traffic, wherein the method comprises:
adding tokens at a committed information rate to the penultimate bucket of a first row if the penultimate bucket is not full of tokens;
adding the tokens at the committed information rate to the last bucket of the first row if the last bucket is not full of tokens;
adding the tokens at the committed information rate to the first bucket of a second row if that bucket is not full of tokens;
adding the tokens at the committed information rate to the second bucket of the second row if that bucket is not full of tokens; and
discarding the tokens at the committed information rate when all token buckets in all colored rows possess a maximum number of tokens allowed within each of the respective token buckets;
wherein, receiving a data packet having a classification that corresponds to a column, comprises:
reducing the number of tokens in a first bucket belonging to the column and associating a first color with the packet if there is a sufficient number of tokens in that first bucket;
reducing the number of tokens in a second bucket belonging to the column and associating a second color with the packet if there is a sufficient number of tokens in that second bucket; and
associating a third color with the packet.

12. The method of claim 11, wherein associating the first color with the packet comprises associating the color green with the packet;
associating the second color with the packet comprises associating the color yellow with the packet; and
associating the third color with the packet comprises associating the color red with the packet.

13. The method of claim 11, wherein the sufficient number of tokens is determined by comparing a size of the data packet to the number of tokens in the bucket.

14. The method of claim 13, wherein there is a sufficient number of tokens if the number of tokens in a bucket is greater than or equal to the size of the packet.

15. The method of claim 14, wherein the size of the packet is measured in bytes.

16. The method of claim 11, wherein a bucket is full of tokens if the bucket has the maximum number of tokens.

17. The method of claim 11, wherein there is a sufficient number of tokens if the number of tokens in a bucket is greater than or equal to a threshold value.

18. The method of claim 11 wherein the columns are classified based at least in part on a, protocol associated with traffic received.

19. The method of claim 11, further comprising:
adding, at a second rate, a number of tokens to the first bucket of the second row if that bucket is not full of tokens, else
adding, at the second rate, the number of tokens to the second bucket of the second row if that bucket is not full of tokens.

20. In a metering device having colored rows and classified columns of token buckets and wherein each token bucket is capable of having a maximum number of tokens, a method to give preferential treatment to higher priority traffic and allow lower priority traffic to consume up to all available bandwidth based on an absence of the higher priority traffic or a bandwidth consumption rate of the higher priority traffic which is less than a sum of a committed information rate and a peak information rate associated with the higher priority traffic, wherein the method comprises:
adding tokens at a committed information rate to the penultimate bucket of a first row if the penultimate bucket is not full of tokens;
adding the tokens at the committed information rate to the last bucket of the first row if the last bucket is not full of tokens;

discarding tokens at the committed information rate when all token buckets in all colored rows possess a maximum number of tokens allowed within each of the respective token buckets;

adding tokens at a second rate to the first bucket of a second row if that bucket is not full of tokens; and adding tokens at the second rate to the second bucket of the second row if that bucket is not full of tokens; and wherein receiving a data packet having a classification that corresponds to a column, comprises:

reducing the number of tokens in a first bucket belonging to the column and associating a first color with the packet if there is a sufficient number of tokens in that first bucket;

reducing the number of tokens in a second bucket belonging to the column and associating a second color with the packet if there is a sufficient number of tokens in that second bucket; and associating a third color with the packet.

21. The method of claim 20, wherein associating the first color with the packet comprises associating the color green with the packet.

22. The method of claim 20, wherein associating the second color with the packet comprises associating the color yellow with the packet.

23. The method of claim 20, wherein associating the third color with the packet comprises associating the color red with the packet.

24. The method of claim 20, wherein the sufficient number of tokens is determined by comparing a size of the data packet to the number of tokens in the bucket.

25. The method of claim 24, wherein there is a sufficient number of tokens if the number of tokens in a bucket is greater than or equal to the size of the packet.

26. The method of claim 25, wherein the size of the packet is measured in bytes.

27. The method of claim 20, wherein a bucket is full of tokens if the bucket has the maximum number of tokens.

28. The method of claim 20, wherein there is a sufficient number of tokens if the number of tokens in a bucket is greater than or equal to a threshold value.

29. The method of claim 20 wherein the columns are classified based at least in part on a virtual local area network (VLAN) identification (ID) associated with traffic received.

30. In a metering device having colored rows and classified columns of token buckets and wherein each token bucket is capable of having a maximum number of tokens, a method to give preferential treatment to higher priority traffic and allow lower priority traffic to consume up to all available bandwidth based on an absence of the higher priority traffic or a bandwidth consumption rate of the higher priority traffic which is less than a sum of a committed information rate and a peak information rate associated with the higher priority traffic, wherein the method comprises:

adding a number of tokens to the bucket at a committed information rate if the bucket is not full of tokens;

adding a number of tokens at the committed information rate to a second bucket in the row if there is at least one remaining bucket in the row and if the second bucket in the row is not full of tokens;

adding a number of tokens to a first bucket in a second row at the committed information rate if the first bucket in the second row is not full of tokens;

adding a number of tokens to a second bucket in the second row at the committed information rate if the second bucket in the second row is not full of tokens; and discarding a number of tokens at the committed information rate when all token buckets in all colored rows possess a maximum number of tokens allowed within each of the respective token buckets;

wherein receiving a data packet with a classification that corresponds to a column comprises:

reducing the number of tokens in a bucket belonging to the column and associating a first color with the packet if there is a sufficient number of tokens in the bucket;

reducing the number of tokens in another bucket belonging to the column and associating a second color with the packet if there is a sufficient number of tokens in the other bucket; and associating a third color with the packet.

31. The method of claim 30, wherein associating the first color with the packet comprises associating the color green with the packet.

32. The method of claim 30, associating the second color with the packet comprises associating the color yellow with the packet.

33. The method of claim 30, wherein associating the third color with the packet comprises associating the color red with the packet.

34. The method of claim 30, wherein the sufficient number of tokens is determined by comparing a size of the data packet to the number of tokens in the bucket.

35. The method of claim 34, wherein there is a sufficient number of tokens if the number of tokens in a bucket is greater than or equal to the size of the packet.

36. The method of claim 35, wherein the size of the packet is measured in bytes.

37. The method of claim 30, wherein a bucket is full of tokens if the bucket has the maximum number of tokens.

38. The method of claim 30, wherein there is a sufficient number of tokens if the number of tokens in a bucket is greater than or equal to a threshold value.

39. The method of claim 30 wherein the colunms are classified based at least in part on one or more of traffic class, source address, destination address, virtual local area network (VLAN) identification (ID), protocol, priority, DiffServ code point (DSCP), or application type.

40. A machine-readable storage medium having instructions stored thereon that, when executed by a metering device having colored rows and classified columns of token buckets, the instructions cause the metering device to perform a method to give preferential treatment to higher priority traffic and allow lower priority traffic to consume up to all available bandwidth based on an absence of the higher priority traffic or a bandwidth consumption rate of the higher priority traffic which is less than a sum of a committed information rate and a peak information rate associated with the higher priority traffic, wherein the method comprises:

adding tokens to a first token bucket in a first colored row having a high priority, wherein the tokens are added at a committed information rate up to a maximum number of tokens allowed in the first token bucket, wherein tokens in the first token bucket in excess of the committed information rate and up to the maximum number of tokens allowed in the first token bucket correspond to the peak information rate for the first token bucket, and wherein the higher priority traffic consumes tokens from the first token bucket based on the bandwidth consumption rate of the higher priority traffic;

adding tokens in excess of the maximum number of tokens allowed in the first token bucket to one or more other token buckets in the same first colored row having the same high priority and a different classified column, wherein the tokens are added to the one or more other token buckets at the committed information rate, and wherein the higher priority traffic consumes tokens from the one or more other token buckets based on the bandwidth consumption rate being in excess of the committed information rate and the peak information rate requiring more tokens than are available in the first token bucket;

adding tokens in excess of a maximum number of tokens allowed in the one or more other token buckets to a lower priority token bucket belonging to a different colored row having a lower priority than the first token bucket in the first colored row and belonging to the same classified colunm as the first token bucket, wherein the tokens are added to the lower priority token bucket at the committed information rate up to a maximum number of tokens allowed in the lower priority token bucket; and discarding tokens at the committed information rate when all token buckets in all colored rows possess a maximum number of tokens allowed within each of the respective token buckets.

41. The machine-readable storage medium of claim 40, wherein the method further comprises:

when receiving a data packet having a classification that corresponds to a colunm, reducing the number of tokens in a bucket belonging to the colunm and associating a first color with the packet if there is a sufficient number of tokens in the bucket, else reducing the number of tokens in a different bucket belonging to the column and associating a second color with the packet.

42. The machine-readable storage medium of claim 41, wherein the number of tokens in the different bucket are reduced and the second color is associated with the packet when there is a sufficient number of tokens in the different bucket, else associating a third color with the packet.

43. The machine-readable storage medium of claim 41, wherein the method further comprises:

associating the first color with the packet comprises associating the color green with the packet;

associating the second color with the packet comprises associating the color yellow with the packet; and associating the third color with the packet comprises associating the color red with the packet.

44. The machine-readable storage medium of claim 40, wherein the method further comprises:

adding tokens in excess of the maximum number of tokens allowed in the lower priority token bucket to one or more other lower priority token buckets in the different colored row having the lower priority than the first token bucket in the first colored row, wherein the one or more other lower priority token buckets each belong to a different classified colunm than the first lower priority token bucket, and wherein the tokens are added to the one or more other lower priority token buckets at the committed information rate up to a maximum number of tokens allowed for each of the one or more other lower priority token buckets, and further wherein a lower priority traffic consumes tokens from the one or more lower priority token buckets based on a lower priority assigned to the lower priority traffic and based further on a bandwidth consumption rate of the lower priority traffic being in excess of the committed information rate for the lower priority traffic and the peak information rate for the lower priority traffic requiring more tokens than are available in the first lower priority token bucket.

45. The machine-readable storage medium of claim 40, wherein tokens are added to other buckets each bucket at one or more different rates, distinct from the committed information rate at which tokens are initially added to the first token bucket.

46. The machine-readable storage medium of claim 41, wherein the sufficient number of tokens is determined by comparing a size of the data packet to the number of tokens in the bucket, and wherein there is a sufficient number of tokens when the number of tokens in a bucket is greater than or equal to the size of the packet measured in bytes.

47. The machine-readable storage medium of claim 40, wherein a bucket is full of tokens if the bucket has the maximum number of tokens.

48. The machine-readable storage medium of claim 41, wherein there is a sufficient number of tokens if the number of tokens in a bucket is greater than or equal to a threshold value.

49. The machine-readable storage medium of claim 40, wherein the colunms are classified based at least in part on a DiffiServ code point (DSCP) associated with traffic received.

* * * * *